(12) United States Patent
Simpkins (10) Patent No.: US 11,914,542 B2
(45) Date of Patent: Feb. 27, 2024

(54) METHOD AND SYSTEM TO GENERATE AN EVENT WHEN A SERIAL INTERFACE IS DISCONNECTED

(71) Applicant: CANTALOUPE, INC., Malvern, PA (US)

(72) Inventor: Joseph A. Simpkins, West Chester, PA (US)

(73) Assignee: CANTALOUPE, INC., Malvern, PA (US)

( * ) Notice: Subject to any disclaimer, the term of this patent is extended or adjusted under 35 U.S.C. 154(b) by 0 days.

(21) Appl. No.: 18/109,935

(22) Filed: Feb. 15, 2023

(65) Prior Publication Data
US 2023/0259482 A1 Aug. 17, 2023

Related U.S. Application Data

(60) Provisional application No. 63/310,769, filed on Feb. 16, 2022.

(51) Int. Cl.
| | |
|---|---|
| *G06F 13/40* | (2006.01) |
| *G06F 13/42* | (2006.01) |
| *G06F 11/30* | (2006.01) |
| *G06F 1/26* | (2006.01) |

(52) U.S. Cl.
CPC ...... *G06F 13/4081* (2013.01); *G06F 11/3051* (2013.01); *G06F 11/3062* (2013.01); *G06F 13/4282* (2013.01); *G06F 1/266* (2013.01); *G06F 2213/0002* (2013.01)

(58) Field of Classification Search
CPC .. G06F 1/266; G06F 11/3027; G06F 11/3041; G06F 11/3051; G06F 11/3058; G06F 11/3062; G06F 13/385; G06F 13/4081; G06F 13/4265; G06F 13/4282; G06F 2213/0002
See application file for complete search history.

(56) References Cited

U.S. PATENT DOCUMENTS

| | | | | |
|---|---|---|---|---|
| 2001/0033649 | A1* | 10/2001 | Rogers | H04L 65/1026 379/388.01 |
| 2002/0064258 | A1* | 5/2002 | Schelberg, Jr. | G07F 9/002 379/93.12 |

(Continued)

OTHER PUBLICATIONS

International Search Report and Written Opinion for International Application No. PCT/US2023/013092, dated May 25, 2023, 10 pages.

*Primary Examiner* — Thomas J. Cleary
(74) *Attorney, Agent, or Firm* — BUCHANAN INGERSOLL & ROONEY PC (57) ABSTRACT

A host device of a serial device system having a serial communications connection The host device including a host serial communication transceiver connected to a peripheral serial communication transceiver of a peripheral device via a serial connection of a serial communications cable having communication lines. The host device measures electrical power consumption of the host serial communication transceiver to determine when serial communications is prevented due to the serial communications cable being disconnected which includes at least one of the communication lines being detached from the host, detached from the peripheral device, or broken.

22 Claims, 7 Drawing Sheets

(56) References Cited

U.S. PATENT DOCUMENTS

| | | | |
|---|---|---|---|
| 2004/0186689 A1* | 9/2004 | Chu | G06F 13/385 |
| | | | 702/186 |
| 2015/0324321 A1* | 11/2015 | Lin | G06F 1/266 |
| | | | 710/300 |
| 2018/0110108 A1 | 4/2018 | Mielnik et al. | |
| 2020/0178374 A1* | 6/2020 | Holtman | H05B 47/10 |
| 2021/0123986 A1 | 4/2021 | Kagaya | |

* cited by examiner

FIG. 3D

METHOD AND SYSTEM TO GENERATE AN EVENT WHEN A SERIAL INTERFACE IS DISCONNECTED

CROSS REFERENCE TO RELATED APPLICATION

This application claims priority to U.S. Provisional Patent Application No. 63/310,769, filed on Feb. 16, 2022, the contents of such application being incorporated by reference herein.

FIELD OF THE INVENTION

The subject matter disclosed herein relates to devices, systems and methods for generating an event when a serial interface is disconnected.

BACKGROUND OF THE INVENTION

While the universal serial bus (USB) interface has mainstream adoption in the consumer world, the RS-232 serial interface is still in use for various industrial applications including vending machines and kiosks. Generally, the RS-232 serial interface is still in use because it is more reliable, and in many cases, it is easier to implement over USB. However, the RS-232 serial interface may include a number of shortcomings, including for example not being able determine if the RS-232 serial interface has been physically disconnected or not.

SUMMARY OF THE INVENTION

A serial device system having a serial communications connection. The system including a host device including a host serial communication transceiver, and a peripheral device including a peripheral serial communication transceiver connected to the host serial communication transceiver via a serial connection of a serial communications cable having communication lines. The host device measures electrical power consumption of the host serial communication transceiver to determine when serial communications is prevented due to the serial communications cable being disconnected which includes at least one of the communication lines being detached from the host, detached from the peripheral device, or broken.

A host device of a serial device system having a serial communications connection The host device including a host serial communication transceiver connected to a peripheral serial communication transceiver of a peripheral device via a serial connection of a serial communications cable having communication lines. The host device measures electrical power consumption of the host serial communication transceiver to determine when serial communications is prevented due to the serial communications cable being disconnected which includes at least one of the communication lines being detached from the host, detached from the peripheral device, or broken.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Examples of the subject matter disclosed herein are described primarily with respect to vending machines. It should be apparent, however, that the disclosed subject matter is not so limited. The systems, devices, and methods described herein may be usable in connection with any serial communication device (e.g. Kiosks). Other uses for the examples below will be known from the description herein.

Overview

This disclosure describes a system/method containing a host device and a peripheral device that communicate with each other via a 2-line, RS-232 serial interface cable having two communication lines plus a ground line (3 lines in total). In such a system, it is beneficial to know if the peripheral device is physically disconnected from the host. Detachment could be caused, for example, by a RS-232 cable failure, RS-232 connector failure, or by manual removal the RS-232 connector or cable by the user.

In a serial interface system, there is usually one host device referred to as Data Terminal Equipment (DTE) and one peripheral device referred to as Data Communication Equipment (DCE) that communicate between each other by using a cable. The serial interface in its simplest and lowest cost form is known as a two-wire interface. It contains a Transmit (Txd) line and a Receive (Rxd) line, where Txd carries data from the host device to peripheral device, and Rxd carries data from the peripheral device to the host device. For communications to succeed, both of these lines, and the ground line (3 wires in total) need to be ohmically connected from host to peripheral. The ohmic connections may be satisfied by using a 3-wire cable.

An issue of concern arises when the host device attempts to initiate communications with the peripheral device, but the host does not receive a response from the peripheral device. The reason why a response is not received can be important for resolving the issue. Some possibilities include:

1) the peripheral device is disconnected from (i.e. not ohmically connected to) the serial interface, 2) the peripheral device is not powered ON, and 3) the peripheral device is broken. A focus of this application is the description of a system and method of determining if the peripheral device is physically connected to the serial interface, and to generate an event, and transmit the event in a status message to remote management service. The event indicating that the 2-line RS-232 interface is physically disconnected (e.g. host device is not ohmically attached to the peripheral device), or that the 2-line RS-232 interface is physically attached but the peripheral device is unresponsive to communication attempts from the host device. The remote management service can then process the event, and if necessary generate/send an alert to interested parties (e.g. vending machine owner/operator). The alert may be numeric error code (e.g. "VM123E13") identifying the Vending Machine (VM123) and the underlying error (E13), or a phrase (e.g. "Peripheral Device in Vending Machine 123 is Disconnected! Please check cabling", "Peripheral Device connected but unresponsive in Vending Machine 123! Please check Peripheral Device", etc.)

System Hardware

The examples described throughout the description and depicted throughout the figures are directed to a vending machine that uses an RS-232 connection. However, it is noted that the system would work for any device communicating via an RS-232 connection. For example, the vending machine in the figures and description below could alternatively be a Kiosk (e.g. ticket kiosk, internet kiosk, information kiosk, photo kiosk, self-service kiosk, etc.) or any other device that communicates via an RS-232 connection.

Figure 1:
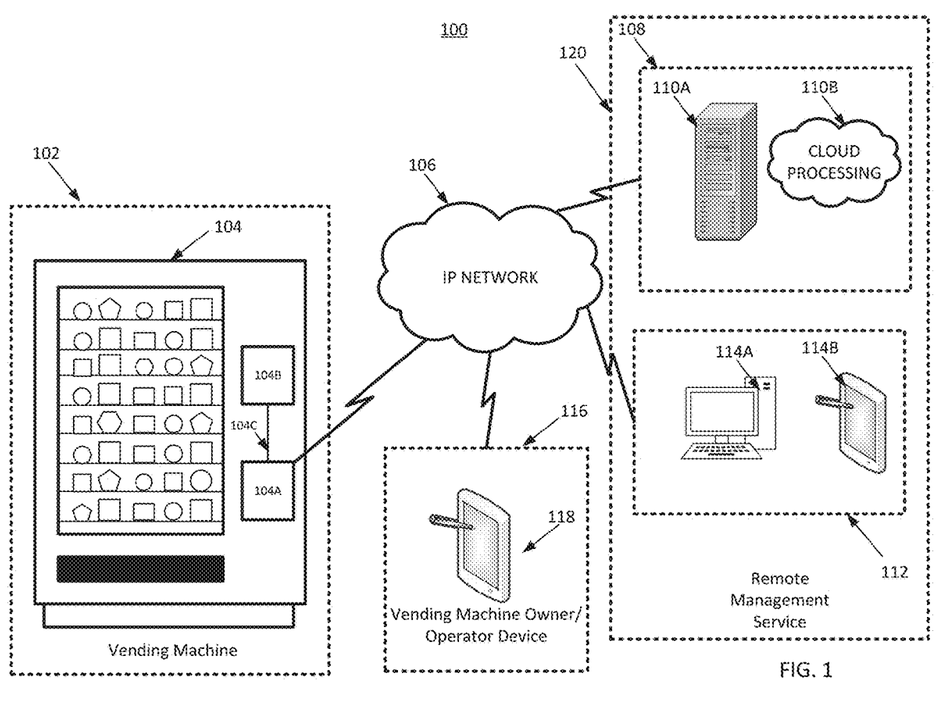
FIG. 1 is system diagram showing network connections between a vending machine, an owner/operator device and a remote management service device/server, according to an aspect of the disclosure.

FIG. 1 is an overall system diagram showing network connections between a vending machine, remote management service and user device. Specifically, the system may include one or more vending machines 104 that are monitored/controlled by a remote management service 120 including one or more remote management service devices such as personal computer 114A and/or smart devices such as smartphone 114B and remote management service IP servers 110A and/or cloud processing 110B via an internet protocol (IP) network. The remote management service 120 may be a third party service for remotely managing (e.g. monitoring vending machine performance, controlling vending machine operation, etc.) on behalf of owners/operators of the vending machines. Furthermore, one or more user devices 118 may be used by the owners/operators of the vending machines to access data collected by remote management service 120. It is noted that multiple services (e.g. cloud services) may be provided by service 120. These services include but are not limited to monitoring of the vending machine and processing of cashless payments.

In one example, vending machine 104 may be located in a vending machine location 102 (e.g. office building, school, etc.), and may include a host device 104A ohmically connected to a peripheral device 104B via cable RS-232 cable 104C. Host device 104A may be, for example, a main controller of the vending machine, or a separate controller installed on and/or coupled to the vending machine (e.g., as part of a vending machine audit system, cashless payment system, or remote management system). For example, if host device 104A is a separate device (i.e. not part of the vending machine controller), host device 104A may be ohmically connected to a peripheral device 104B via the serial bus of the vending machine, and may be connected to the vending machine controller via a multi drop bus (MDB) not shown. Peripheral device 104B may be any device that collects data (e.g. credit card reader, bill acceptor, vending stock sensor, etc.). For example, when peripheral device 104B is a credit card reader, the user may insert or tap their credit card to the reader and choose their selected item, which is then dispensed from the vending machine. The information pertaining to the quantity and monetary collections of the selected item may be sent from peripheral device 104B to host device 104A via RS-232 serial cable 104C, and then forwarded to remote management service IP server 110A or cloud processing 110B located in a remote location 108. This information may be accessed by remote management service devices 114A and or 114B located in remote location 112. Access to the information may be facilitated via a transmission from the vending machine controller in response to a request from remote management service devices (e.g. 110A, 114A, 114B, 118, etc.), an automatic data push from the vending machine controller to remote management service devices 114A and or 114B, or any other suitable communication method. In general, remote management service IP server 110A or cloud processing 110B and remote management service device 114 may work together as part of remote management service 120 to store and process the received data from the credit card reader. Processing may include keeping track of vending stock and monetary performance of the vending machine, receiving and/or processing events relating to servicing requirements of the vending machine, and generating reports and alerts for retrieval by vending machine owner/operator device 118 in remote location 116.

An important event determined by remote management service 120 includes the connection state between host device 104A and peripheral device 104B. As mentioned in the introduction, host device 104A is connected to peripheral device 104B via RS-232 cable 104C. However, in practice, RS-232 cable 104C may become disconnected due to a break in the cable itself, a connector thereof, or more likely, due to a technician or unauthorized user unplugging cable 104C from host device 104A and/or peripheral device 104B. In this scenario, the information cannot be sent from peripheral device 104B to host device 104A, and thus the remote management service cannot properly monitor the performance of the vending machine. It would therefore be beneficial for the remote management service to be able to detect such a scenario in order to alert a customer support agent of the remote management service, or to alert the vending machine owner/operator of the problem. For example, if peripheral device 104B is a card reader that is disconnected from host device 104A, then cashless sales cannot be made. However the host device 104A can still continue functioning as an audit device for collecting information such as data exchange (DEX) information from the vending machine. This limited functionality could be determined and alerted to the vending machine owner/operator. Solutions to this problem are now described with respect to the following figures.

Figure 2A:
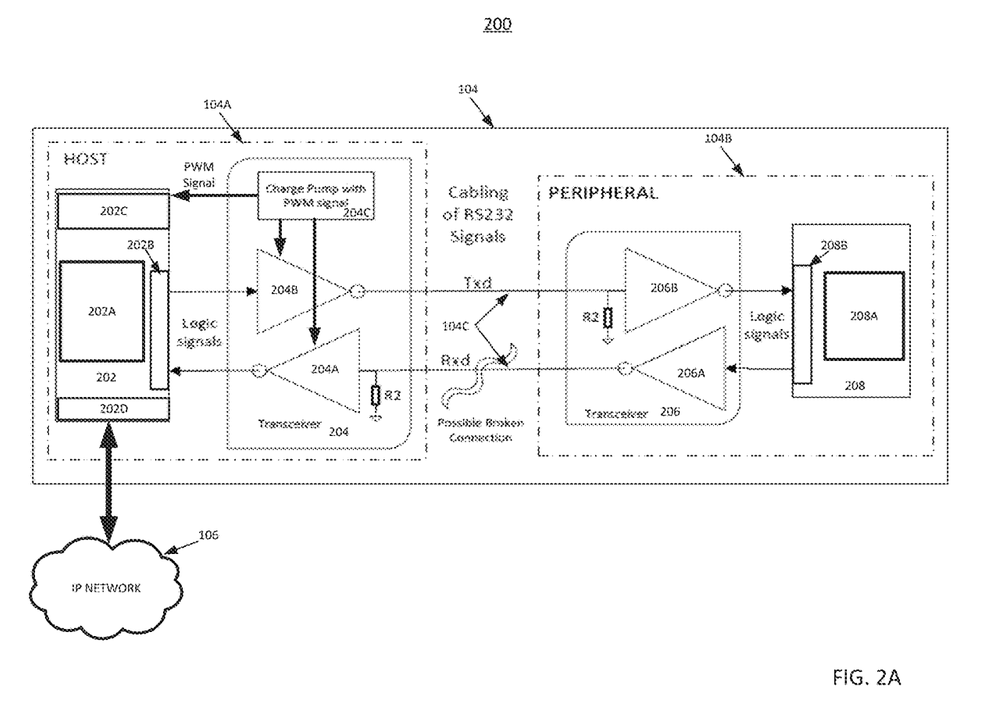
FIG. 2A is a diagram showing an RS-232 connection between a host device having a transceiver with a charge pump, and a peripheral device, according to an aspect of the disclosure.

FIG. 2A is a diagram showing a first example of an RS-232 connection between a host device 104A having a charge pump and a peripheral device 104B. In this first example, host device 104A includes controller 202 and transceiver 204. Controller 202 includes a processor 202A, a serial interface 202B such as a universal asynchronous receiver-transmitter (UART) to interface processor 202A to receiver 204A and transmitter 204B of transceiver 204, a power monitoring interface 202C to interface processor 202A to a charge pump 204C of transceiver 204, and an IP transceiver 202D for communicating via the IP network 106.

Likewise, peripheral device 104B includes a controller 208 and a transceiver 206. Controller 208 includes a processor 208A and a serial interface 208B such as a UART to interface processor 208A to transmitter 206A and receiver 206B of transceiver 206. It is noted that RS-232 cable 104C connecting host transceiver 204 to peripheral transceiver 206 includes a transmission conductor (Txd), a reception conductor (Rxd), and a ground conductor (not shown).

It is also noted that in this example, transceiver 204 includes a charge pump 204C that controls receiver 204A and transmitter 204B to perform conversions between logic signal voltage levels (e.g. 0V-3.3V) and RS-232 signals voltage levels (e.g. ±5V) received and transmitted by receiver 204A and transmitter 204B respectively. In order to perform the voltage conversion, charge pump 204C includes an inherent pulse width modulation (PWM) signal that corresponds to the electrical current flowing through the transceiver (e.g. electrical power consumption of the transceiver). Thus, the PWM signal of charge pump 204C can be used for power monitoring.

During operation, transmitter 204B of host transceiver 204, with the help of charge pump 204C, converts logic signals (e.g. data) from processor 202A to RS-232 signals which are then transmitted over line Txd to the peripheral transceiver 206. These signals are received by receiver 206B of transceiver 206, and processed by processor 208A of peripheral controller 208. Likewise, transmitter 206A of peripheral transceiver 206, with the help of a charge pump (not shown), converts logic signals (e.g. data) from processor 208A to RS-232 signals which are then transmitted over receive line Rxd to the host transceiver 204. These signals are received by receiver 204A of host transceiver 204, and processed by processor 202A of host controller 202 and may be forwarded to the remote management service 120 via IP network 106 immediately, or at a later time.

Checking the RS-232 line connection between host device 104A and peripheral device 104B is important to ensuring communication between the devices is physically possible. This check could be triggered in number of different ways. In one example, the connection RS-232 line checking process could be triggered in response to a failed communication attempt from host device 104A to the peripheral device 104B. In another example, host device 104A could periodically perform the RS-232 line connection checking process. In order to check this RS-232 line connection, host device 104A includes a power monitoring interface 202C to receive information from charge pump 204C. In the example shown in FIG. 2A, power monitoring interface 202C may be an analog-to-digital converter (ADC) or a capture-timer. In one example, the analog PWM signal can be low-pass filtered which converts the PWM signal to a voltage that is proportional to the PWM duty cycle. The filtered signal is then input to the ADC of interface 202C. The ADC then provides the digitized samples to processor 202A which determines the duty cycle of the PWM signal. In another example, the PWM signal produced by charge pump 204C can be digitized by use of the capture-timer on processor 202A, which determines the duty cycle of the PWM signal based on captured pulse timing. This duty cycle can be measured by processor 202A to determine the corresponding electrical current flowing through transceiver 204. This captured duty cycle is processed by processor 202A to determine the corresponding electrical current flowing through transceiver 204. In either scenario, processor 202A is able to use the PWM signal inherent in host transceiver 204 to determine the electrical current flowing through host transceiver 204 at any given time. It is noted that ADC scaling and offset corrections representing the approximate scaled electrical current consumption may be needed depending on when the driver is ON (add an offset) or the driver is OFF (remove the offset). The scaling factor may be predetermined by measuring the electrical current of several host devices against serial loads of known resistance values and by determining an average electrical current value. Once the scaling factor is known, then several peripheral devices may be measured to obtain the threshold for determining when the peripheral device is physically attached or not. For example, the following equation could be used: electrical current_load=scale_factor*(adc_code_ON−adc_code_OFF), where adc_code_ON is the measured current when the transceiver is enabled, and adc_code_OFF is the measured current when the transceiver is disabled. In this example, the electrical current_load is compared to the predetermined threshold described above. If the electrical current_load>predetermined threshold, then it is determined that the peripheral is attached. If electrical current_load≤predetermined threshold, then then it is determined that the peripheral is not attached. Filtering may also be used such that adc_code_OFF and adc_code_ON are determined based on a running average of (2^n) measurements. This filtering helps in reducing noise and false positives. In either case, the electrical current is then used to determine if RS-232 line 104C is ohmically connected to host device 104A and peripheral device 104B. This determination can, in one example, be based on comparing idle electrical currents flowing through the transceiver during an enabled state and a disabled state. This determination is described in detail in the in the next section with respect to FIGS. 3A-3C.

Figure 2B:
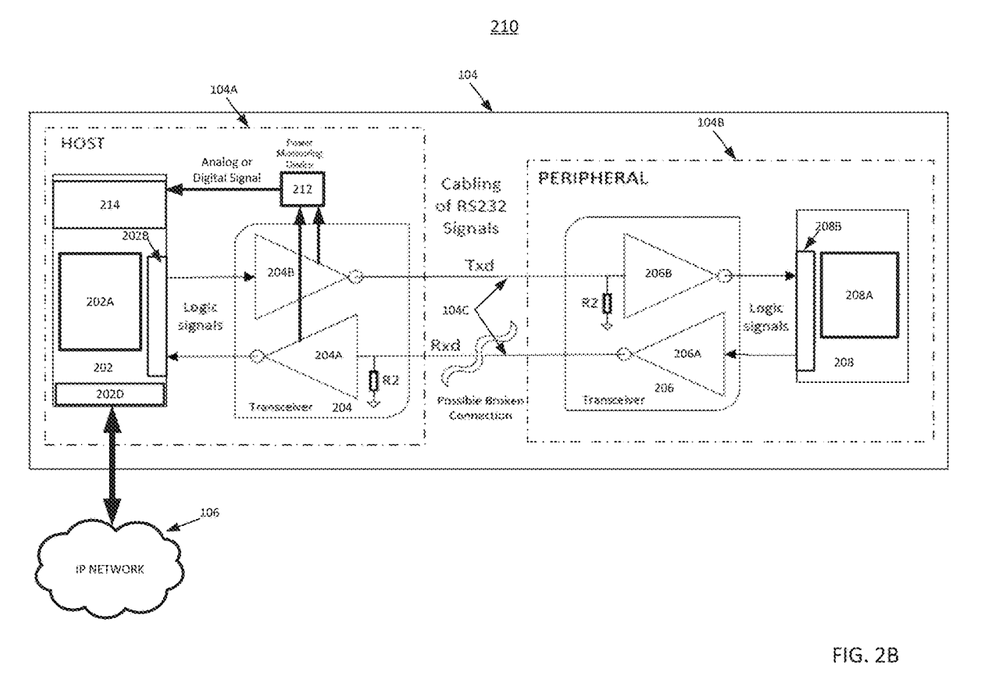
FIG. 2B is a diagram showing an RS-232 connection between a host device having a transceiver with a power monitoring device, and a peripheral device, according to an aspect of the disclosure.

FIG. 2B is a diagram showing a second example of an RS-232 connection between a host device. In this second example, host device 104A and peripheral device 104B generally include many of the same components, and therefore the description of these similar components is omitted for brevity.

The main differences between FIG. 2A and FIG. 2B include the use of power monitoring device 212 and power monitoring interface 214. Specifically, not all transceivers may include charge pumps for producing a PWM signal like the one shown in FIG. 2A. In transceivers like the one in FIG. 2B that do not include a charge pump for producing a PWM signal, another means of determining transceiver electrical current is needed. Thus, FIG. 2B shows an example, where a conventional power monitoring sensor 212 is added to the host device for monitoring electrical current of the host's transceiver.

During operation, transmitter 204B of host transceiver 204, converts logic signals (e.g. data) from processor 202A to RS-232 signals which are then transmitted over line Txd to the peripheral transceiver 206. These signals are received by receiver 206B of transceiver 206, and processed by processor 208A of peripheral controller 208. Likewise, transmitter 206A of peripheral transceiver 206, converts logic signals (e.g. data) from processor 208A to RS-232 signals which are then transmitted over line Rxd to the host transceiver 204. These signals are received by receiver 204A of transceiver 204, and processed by processor 202A of host controller 202 and may be forwarded to the remote management service 120 via IP network 106 immediately, or at a later time.

In FIG. 2B, in order to check the RS-232 line connection, host device 104A relies on a power monitoring interface 214 which may be an ADC. Therefore, the analog power signal produced by power monitoring device 212 can be digitized and processed by processor 202A to determine the corresponding electrical current flowing through transceiver 204. It is noted that similar to FIG. 2A, ADC scaling and offset corrections representing the approximate scaled electrical current consumption may be needed depending on when the driver is ON (add an offset) or the driver is OFF (remove the offset). Alternatively, if power monitoring device 212 is a digital sensor, the digital signal can be directly processed by processor 202A to determine the corresponding electrical current flowing through transceiver 204. In either scenario, processor 202A is able to use the power monitoring signal of power monitoring device 212 to determine the electrical current flowing through transceiver 204 at any given time. This electrical current is then used to determine if RS-232 line 104C is ohmically connected to host 104A and peripheral device 104B. Again, this determination is generally based on comparing idle electrical currents flowing through the transceiver during an enabled state and a disabled state. This determination is described in detail in the in the next section with respect to FIGS. 3A-3C.

Operational Examples

Figure 3A:
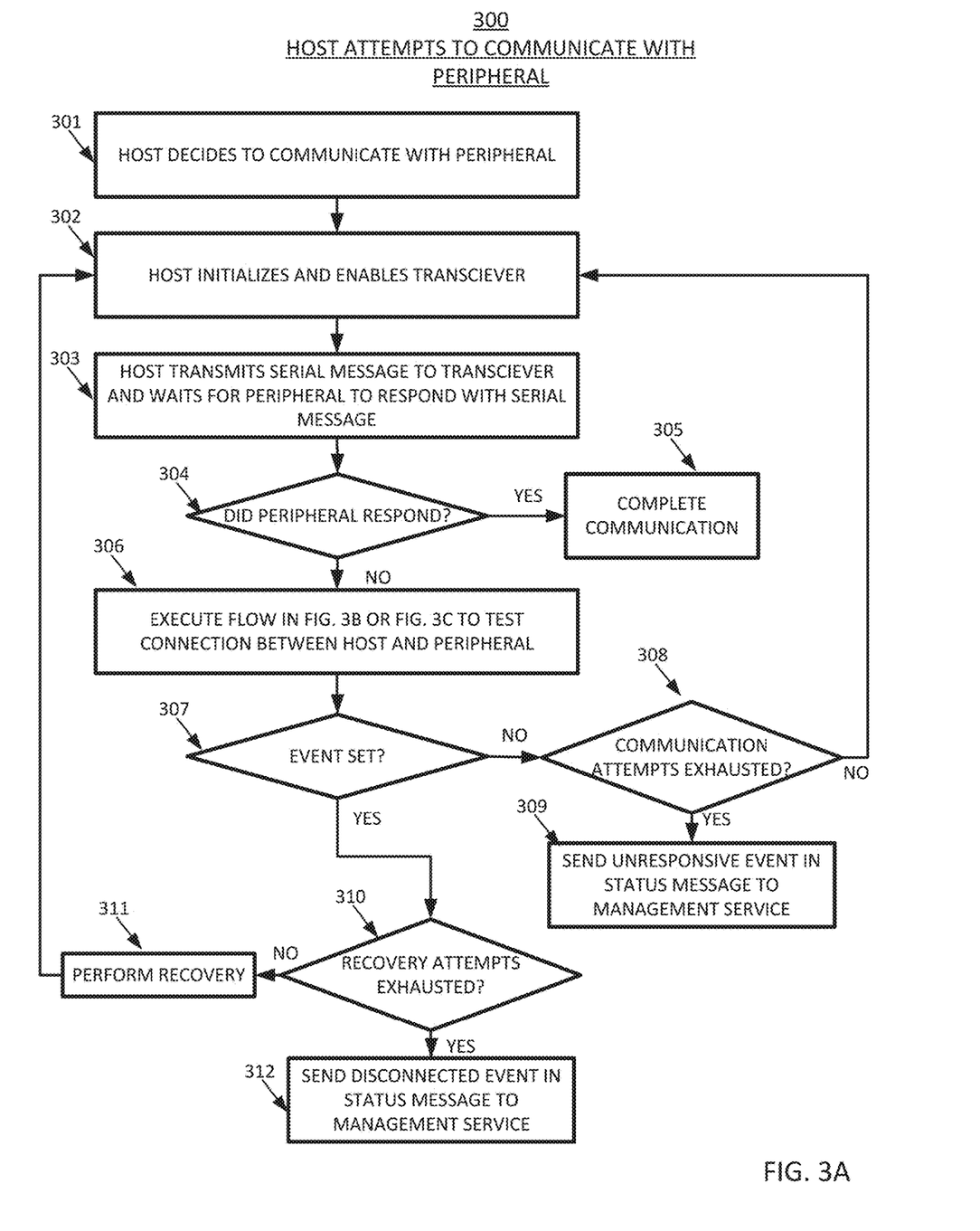
FIG. 3A is a flowchart describing a method for testing the RS-232 connection and the responsiveness of the peripheral device, according to an aspect of the disclosure.

FIG. 3A is a flowchart describing a method 300 for testing responsiveness and the RS-232 connection of the peripheral device. In step 301, host 104A decides to communicate with the peripheral device. In order to perform the test, host 104A, in step 302, initializes and enables host transceiver 204, and in step 303, transmits a serial message to peripheral transceiver 206 and waits for a response. If in step 304 it is determined that the peripheral has responded, then communication is completed (e.g. host and peripheral exchange messages until a successful conclusion is reached) in step 305. If, however, in step 304, it is determined that the peripheral did not respond, then step 306 executes the flowchart in either FIG. 3B or 3C to test the RS-232 connection between the host and the peripheral. Details of these test are described below with reference to FIGS. 3B and 3C. In step 307 host 104A determines if an event (possible disconnected peripheral) was set by the execution of flowchart in either FIG. 3B or 3C.

If an event was set, host 104A determines if recovery attempts (attempts to reboot and recover peripheral) have been exhausted or not in step 310. If recovery attempts have been exhausted, host 104A sends a disconnected event in a status message (message indicating that peripheral is disconnected) to management service 120 in step 312. If recovery attempts have not been exhausted, host 104A attempts to perform recovery in step 311 and repeating the process starting from step 302. Recovery may include the action of rebooting the peripheral.

If an event was not set, host 104A determines if all communication attempts (attempts to establish communication with the peripheral) have been exhausted or not in step 308. If communication attempts have been exhausted, host 104A sends an unresponsive event in a status message (message indicating that peripheral is connected but unresponsive) to the management service 120 in step 309. If communication attempts have not been exhausted, host 104A repeats (possibly after a predetermined time delay) the process starting from step 302.

As mentioned above, with respect to step 306, there are processes for testing the RS-232 connection between the host and the peripheral. These tests are now described with respect to FIGS. 3B and 3C.

Figure 3B:
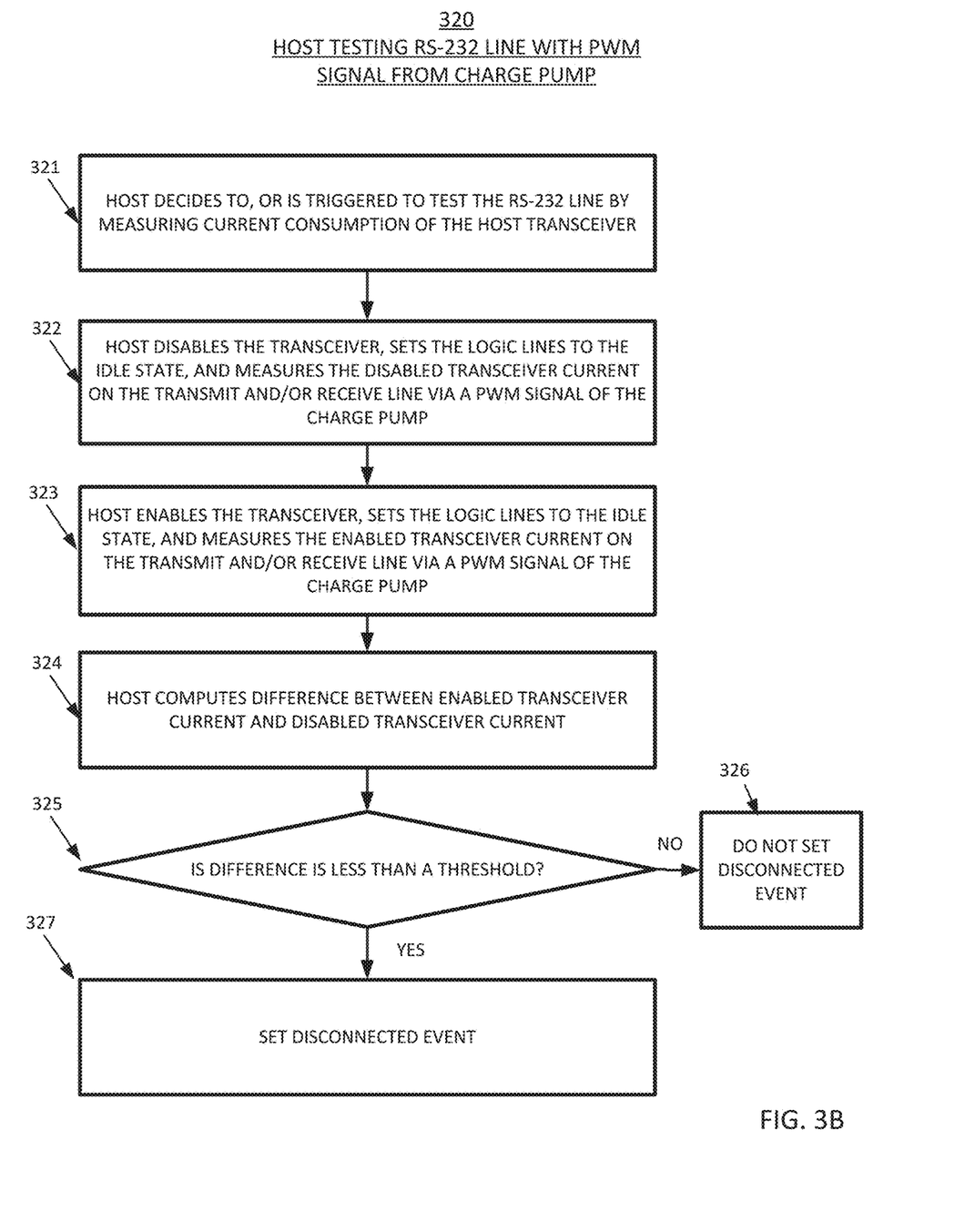
FIG. 3B is a flowchart describing a method for testing the RS-232 connection using a signal from the charge pump, according to an aspect of the disclosure.

FIG. 3B is a flowchart describing a method 320 for testing the RS-232 line using a signal from the charge pump in the example of FIG. 2A. In step 321, host 104A tests RS-232 line 104C, e.g. in response to local stimulus such as a periodic signal (e.g. internal time schedule), a failure in establishing a serial exchange, or in response to external stimulus such a trigger to test RS-232 line 104C, e.g. by instructions received from the remote management service 120 (e.g. monitoring service time schedule, customer request, etc.).

In order to perform this test, in step 322, host controller 202 disables transceiver 204, sets the logic lines to the idle state (i.e. no data is transmitted and voltage levels are held at a constant level), and processor 202A determines the disabled transceiver 204 electrical current (Imd) on the transmit (Txd) and/or receive (Rxd) line based on the PWM signal of a charge pump 204C received via power monitoring interface 202C. In step 323, host controller 202 then enables transceiver 204, sets the logic lines to the idle state (i.e. no data is transmitted and voltage levels are at a constant level), and processor 202A determines the enabled transceiver 204 electrical current (Ime) on the transmit (Txd) and/or receive (Rxd) line based on the PWM signal of a charge pump 204C received via power monitoring interface 202C. In step 324, processor 202A then computes a difference electrical current (Idiff) between the enabled transceiver 204 electrical current (Ime) and the disabled transceiver 204 electrical current (Imd) as current_load (Idiff)= scale_factor*(measured_code_ON (Ime)−measured_code OFF (Imd), where measured_code_ON is when the code from the LPF/ADC or the capture-timer is ON, and measured_code_OFF is when the code from the LPF/ADC or the capture-timer is OFF. When the RS-232 connection is ohmically connected between the devices, difference electrical current (Idiff) is greater than a threshold because the enabled electrical current will be higher than the disabled electrical current. However, when the RS-232 connection is disconnected, the difference electrical current (Idiff) is less than the threshold because the enabled electrical current will be the same as or similar to the disabled electrical current. As mentioned above, the code may be measured either via the LPF/ADC, or via the capture-timer. Thus, the referenced measured code in the equation above is different depending on the embodiment. In an example where the code is measured via LPF and ADC, processor 202A computes (Idiff) as current_load (Idiff)=scale_factor*(ADC_code_ON (Ime)−ADC_code_OFF (Imd). Alternatively, in an example where the code is measured via the capture-timer, processor 202A computes (Idiff) as current_load (Idiff)=scale_factor* (CaptureTimer_code_ON (Ime)−CaptureTimer_code_OFF (Imd). Regardless of the manner in which (Idiff) is computed, (Idiff) is compared to a threshold in step 325. If in step 325, it is determined that the difference is less than a threshold, then host 104A sets an event in step 327 thereby indicating the possibility that the RS-232 connection is not ohmically connected. If, however, in step 325, it is determined that the difference is not less than the threshold, then host 104A does not set an event in step 326, thereby indicating that the RS-232 connection is ohmically connected.

Figure 3C:
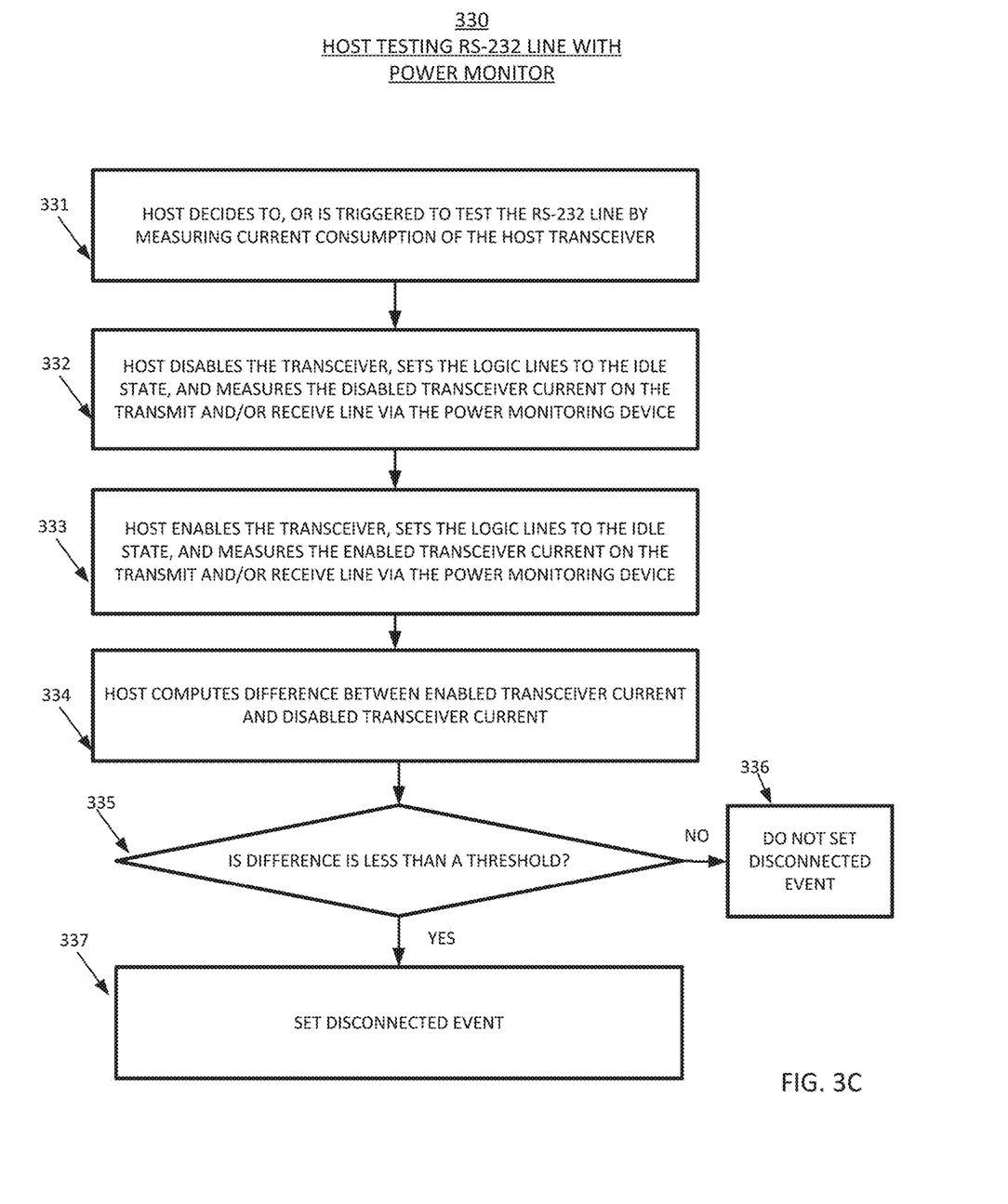
FIG. 3C is a flowchart describing a method for testing the RS-232 connection using a signal from the power monitoring device, according to an aspect of the disclosure.

FIG. 3C is a flowchart describing another method 330 for testing the RS-232 line using a signal from the power monitoring device in the example of FIG. 2B. In step 331, host 104A decides to test RS-232 line 104C, e.g. in response to local stimulus such as a periodic signal (e.g. internal time schedule), a failure in establishing a serial exchange, or in response to external stimulus such a trigger to test RS-232 line 104C, e.g. by instructions received from the remote management service 120 (e.g. monitoring service time schedule, customer request, etc.). In step 332, host controller 202 disables transceiver 204, sets the logic lines to the idle state (i.e. no data is transmitted and voltage levels are at a constant level), and processor 202A determines the disabled transceiver 204 electrical current (Imd) on the transmit (Txd) and/or receive line (Rxd) based on the power monitoring signal of power monitoring device 212 received via power monitoring interface 214. It is noted that power monitoring device 212 may be analog or digital. When power monitoring device 212 is analog, power monitoring interface 214 is an ADC. When power monitoring device 212 is digital, power monitoring interface 214 is a digital interface. In step 333, host controller 202 then enables transceiver 204, sets the logic lines to the idle state (i.e. no data is transmitted and voltage levels are at a constant level), and processor 202A determines the enabled transceiver 204 electrical current (Ime) on the transmit (Txd) and/or receive line (Rxd) based on the power monitoring signal received via power monitoring interface 202C. In step 334, processor 202A then computes a difference electrical current (Idiff) between the enabled transceiver 204 electrical current (Ime) and the disabled transceiver 204 electrical current (Imd) as current_load (Idiff)=scale_factor*(measured_code_ON (Ime)−measured_code_OFF (Imd)), where measured_code_ON is when the code of the power monitoring device measured by either the ADC or the digital interface is ON, and measured_code_OFF is when the when the code of the power monitoring device measured by either the ADC or the digital interface is OFF. When the RS-232 connection is ohmically connected, difference electrical current (Idiff) is greater than a threshold because the enabled electrical current will be higher than the disabled electrical current. However, when the RS-232 connection is disconnected, the difference electrical current (Idiff) is less than the threshold because the enabled electrical current will be the same as or similar to the disabled electrical current. As mentioned above, the code may be either be analog code from power monitoring device, or digital code from the power monitoring device. Thus, the referenced measured code in the equation above is different depending on the embodiment. In an example where the code is analog, processor 202A computes (Idiff) as current_load (Idiff)=scale_factor* (ADC_ code_ON (Ime)−ADC_code_OFF (Imd). Alternatively, in an example where the code is digital, processor 202A computes (Idiff) as current_load (Idiff)=scale_factor* (digital_code_ON (Ime)−digital_code_OFF (Imd). Regardless of the manner in which (Idiff) is computed, (Idiff) is compared to a threshold in step 335. If in step 335, it is determined that the difference is less than a threshold, then host 104A sets an event in step 337 thereby indicating the possibility that the RS-232 connection is not ohmically connected. If, however, in step 335, it is determined that the different is not less than the threshold, then host 104A does not set an event in step 336 thereby indicating that the RS-232 connection is ohmically connected.

Figure 3D:
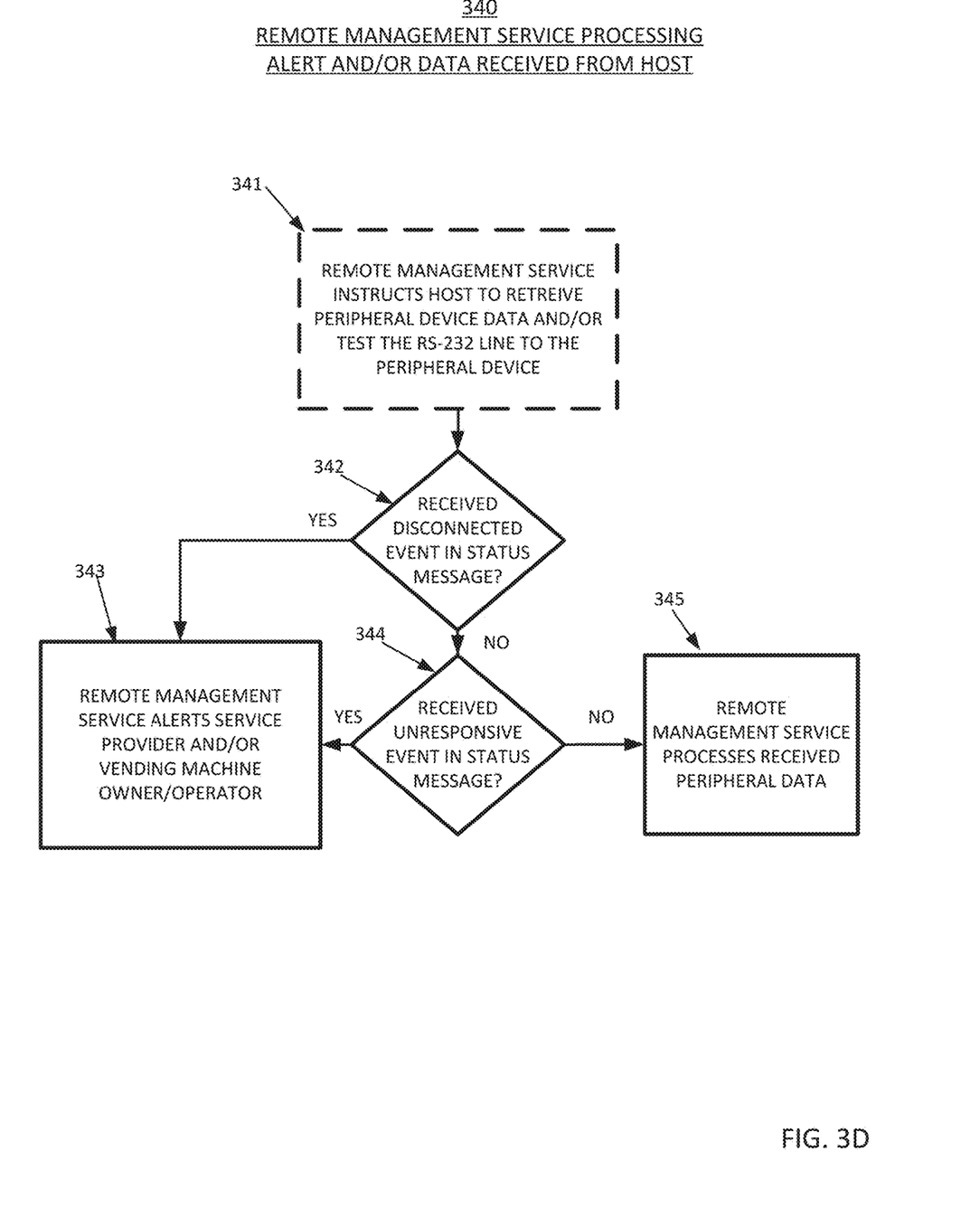
FIG. 3D is a flowchart describing a method processing an event received from the host device, according to an aspect of the disclosure.

FIG. 3D is a flowchart describing a method 340 where the monitoring service processes the status messages and the data received from the host device. During normal operation, host device 104A attempts to retrieve peripheral device data, and performs the test of the RS-232 line if the attempt fails. However, in an alternative optional step 341, the remote management service 120 may actively instruct host device 104A to retrieve peripheral device data and/or test the RS-232 line to the peripheral device. In either case, if host 104A transmits a disconnected event in a status message or an unresponsive event in a status message to the monitoring service 120 via IP network 106, these status messages are processed in steps 342 and 344 respectively. If a disconnected event in a status message is determined in step 342, the monitoring service 120, in step 343, alerts the monitoring service provider and/or a customer support agent, and/or the vending machine owner/operator that the RS-232 line is disconnected from the identified vending machine peripheral. If, however, an unresponsive event in a status message is determined in step 344, the monitoring service 120, in step 343, alerts the monitoring service provider and/or the vending machine owner/operator that the identified vending machine peripheral is connected but unresponsive. This allows vending machine owner/operator to take appropriate actions such as dispatching a technician to service the vending machine and fix the disconnected RS-232 connection or fix/replace the unresponsive peripheral device. In general, the alert may be part of a message identifying the problematic machine, or part of a more comprehensive report containing health statuses of many machines.

In a case where neither the disconnected event in a status message nor the unresponsive event in a status message are received, remote management service 120 processes received peripheral data in step 345. The received peripheral data may include monetary information, vending stock information and the like.

Essentially, the remote management service 120 is able to determine if the RS-232 connection is ohmically connected or not, and if the peripheral device itself is malfunctioning, based on a review/analysis of the events in the received status messages. This information may then be passed on to the owner/operator of the vending machine, or to a customer support agent.

Although the examples described above are directed to a vending machine, it is noted that the system would work for any devices communicating via an RS-232 connection. For example, the vending machine in the figures and description above could alternatively be a Kiosk (e.g. ticket kiosk, internet kiosk, information kiosk, photo kiosk, self-service kiosk, etc.) or any other device that communicates via an RS-232 connection. Other examples devices could include a retail cash register with barcode reader accessory, barcode scanner used for tracking packages and inventory, digital signature reader, etc.

The steps in FIGS. 3A-3D may be performed by the devices in FIGS. 1, 2A and 2B, upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. In one example, data are encrypted when written to memory, which is beneficial for use in any setting where privacy concerns such as protected health information is concerned. Any of the functionality performed by the computer described herein, such as the steps in FIGS. 3A-3D may be implemented in software code or instructions which are tangibly stored on a tangible computer readable medium. Upon loading and executing such software code or instructions by the computer, the controller may perform any of the functionality of the computer described herein, including the steps in FIGS. 3A-3D described herein.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including,"

or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The invention claimed is:

1. A serial device system having a serial communications connection, the system comprising:
    a host device including a host serial communication transceiver; and
    a peripheral device including a peripheral serial communication transceiver connected to the host serial communication transceiver via a serial connection of a serial communications cable having communication lines;
    wherein the host device measures electrical power consumption of the host serial communication transceiver to determine when serial communications are prevented due to the serial communications cable being disconnected including at least one of the communication lines being: detached from the host, detached from the peripheral device, or broken, and
    wherein the host device determines when serial communications are prevented due to the serial communications cable being disconnected by:
        measuring an enabled electrical power consumption as the electrical power consumption of the host serial communication transceiver when the host serial communication transceiver is enabled,
        measuring a disabled electrical power consumption as the electrical power consumption of the host serial communication transceiver when the host serial communication transceiver is disabled, and
        determining that a difference between the enabled electrical power consumption and the disabled electrical power consumption is less than a threshold.

2. The serial device system of claim 1,
    wherein the host device measures the enabled electrical power consumption and the disabled electrical power consumption when the host device is in an idle state and not transmitting data.

3. The serial device system of claim 1,
    wherein the serial connection is an RS-232 connection.

4. The serial device system of claim 1,
    wherein the host device and the peripheral device are incorporated in a vending machine or a kiosk.

5. The serial device system of claim 1,
    wherein the host device determines that:
        a transmission line of the communication lines is disconnected based on a transmission electrical power consumption of a transmitter of the host serial communication transceiver, and
        a reception line of the communication lines is disconnected based on a reception electrical power consumption of a receiver of the host serial communication transceiver.

6. The serial device system of claim 1,
    wherein the host serial communication transceiver includes a charge pump for converting between serial data signal levels of the serial connection and logic data signal levels of the host device, and
    wherein the host measures the electrical power consumption based on a pulse-width modulation (PWM) signal output by the charge pump.

7. The serial device system of claim 6,
    wherein the host device measures the electrical power consumption by low-pass filtering the PWM signal, digitizing the low-pass filtered PWM signal, and processing the digitized low-pass filtered PWM signal.

8. The serial device system of claim 6,
    wherein the host device measures the electrical power consumption by digitizing the PWM signal with a capture timer and processing the digitized PWM signal.

9. The serial device system of claim 1,
    wherein the host device includes an electrical power monitoring device for monitoring the electrical power consumption of the host serial communication transceiver.

10. The serial device system of claim 9,
    wherein when the electrical power monitoring device is an analog device, the host device measures the electrical power consumption by digitizing an analog output signal of the power monitoring device and processing the digitized signal.

11. The serial device system of claim 9,
    wherein when the electrical power monitoring device is a digital device, the host device measures the electrical power consumption by processing a digital output signal of the power monitoring device.

12. A host device of a serial device system having a serial communications connection, the host device comprising:
    a host serial communication transceiver connected to a peripheral serial communication transceiver of a peripheral device via a serial connection of a serial communications cable having communication lines,
    wherein the host device measures electrical power consumption of the host serial communication transceiver to determine when serial communications is prevented due to the serial communications cable being disconnected which includes at least one of the communication lines being: detached from the host, detached from the peripheral device, or broken, and
    wherein the host device determines when serial communications is prevented due to the serial communications cable being disconnected by:
        measuring an enabled electrical power consumption as the electrical power consumption of the host serial communication transceiver when the host serial communication transceiver is enabled, measuring a disabled electrical power consumption as the electrical power consumption of the host serial communication transceiver when the host serial communication transceiver is disabled, and determining that a difference between the enabled electrical power consumption and the disabled electrical power consumption is less than a threshold.

13. The host device of claim 12,
wherein the host device measures the enabled electrical power consumption and the disabled electrical power consumption when the host device is in an idle state and not transmitting data.

14. The host device of claim 12,
wherein the serial connection is an RS-232 connection.

15. The host device of claim 12,
wherein the host device is incorporated in a vending machine or a kiosk.

16. The host device of claim 12,
wherein the host device determines that:
a transmission line of the communication lines is disconnected based on a transmission electrical power consumption of a transmitter of the host serial communication transceiver, and
a reception line of the communication lines is disconnected based on a reception electrical power consumption of a receiver of the host serial communication transceiver.

17. The host device of claim 12,
wherein the host serial communication transceiver includes a charge pump for converting between serial data signal levels of the serial connection and logic data signal levels of the host device, and
wherein the host measures the electrical power consumption based on a pulse-width modulation (PWM) signal output by the charge pump.

18. The host device of claim 17,
wherein the host device measures the electrical power consumption by low-pass filtering the PWM signal, digitizing the low-pass filtered PWM signal, and processing the digitized low-pass filtered PWM signal .

19. The host device of claim 17,
wherein the host device measures the electrical power consumption by digitizing the PWM signal with a capture timer and processing the digitized PWM signal.

20. The host device of claim 12,
wherein the host device includes an electrical power monitoring device for monitoring the electrical power consumption of the host serial communication transceiver.

21. The host device of claim 20,
wherein when the electrical power monitoring device is an analog device, the host device measures the electrical power consumption by digitizing an analog output signal of the power monitoring device and processing the digitized signal.

22. The host device of claim 20,
wherein when the electrical power monitoring device is a digital device, the host device measures the electrical power consumption by processing a digital output signal of the power monitoring device.

* * * * *